(12) United States Patent
Loo

(10) Patent No.: US 7,470,458 B1
(45) Date of Patent: Dec. 30, 2008

(54) SYNTHETIC GROUND COVERING

(76) Inventor: Fern Loo, 4911 SW. 190th Ave., South West Ranches, FL (US) 33332

( * ) Notice: Subject to any disclaimer, the term of this patent is extended or adjusted under 35 U.S.C. 154(b) by 0 days.

(21) Appl. No.: 11/755,640

(22) Filed: May 30, 2007

(51) Int. Cl.
*B32B 9/00* (2006.01)
(52) U.S. Cl. .......................... 428/17; 428/95
(58) Field of Classification Search ............ 428/95, 428/17
See application file for complete search history.

(56) References Cited

U.S. PATENT DOCUMENTS

| | | | |
|---|---|---|---|
| 2,949,698 A | 8/1960 | Downey et al. | |
| 3,870,583 A | 3/1975 | Gidge | |
| 4,062,145 A | 12/1977 | Gidge | |
| 4,489,115 A * | 12/1984 | Layman et al. | 428/62 |
| 4,648,592 A * | 3/1987 | Harinishi | 472/92 |
| 5,292,130 A * | 3/1994 | Hooper | 473/279 |
| 5,301,460 A | 4/1994 | Corbitt | |
| 5,644,998 A | 7/1997 | Krolick | |
| 6,616,542 B1 * | 9/2003 | Reddick | 473/171 |
| 2003/0039773 A1 * | 2/2003 | Paschal et al. | 428/17 |

* cited by examiner

*Primary Examiner*—Keith D. Hendricks
*Assistant Examiner*—Daniel Miller
(74) *Attorney, Agent, or Firm*—Crossley Patent Law; Mark Ashley Crossley

(57) ABSTRACT

A synthetic ground covering that is designed to replicate mulch, lava rocks, flag stones, sand, pebbles, straw, and other natural ground coverings. The ground covering is preferably fabricated from rubber or latex and is produced in rolls that measure fifty (50) feet long and eight (8) to twelve (12) feet wide, with the roll being unrolled like a section of carpet. The ground covering could be cut to conform to the shape of the landscape or designed to fit around trees, poles, and other obstructions. Furthermore, the border would be flexible to allow it to fit within confined spaces or enclosures.

7 Claims, 4 Drawing Sheets

FIG. 3
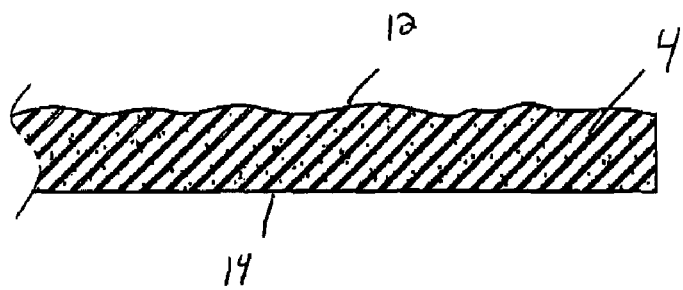
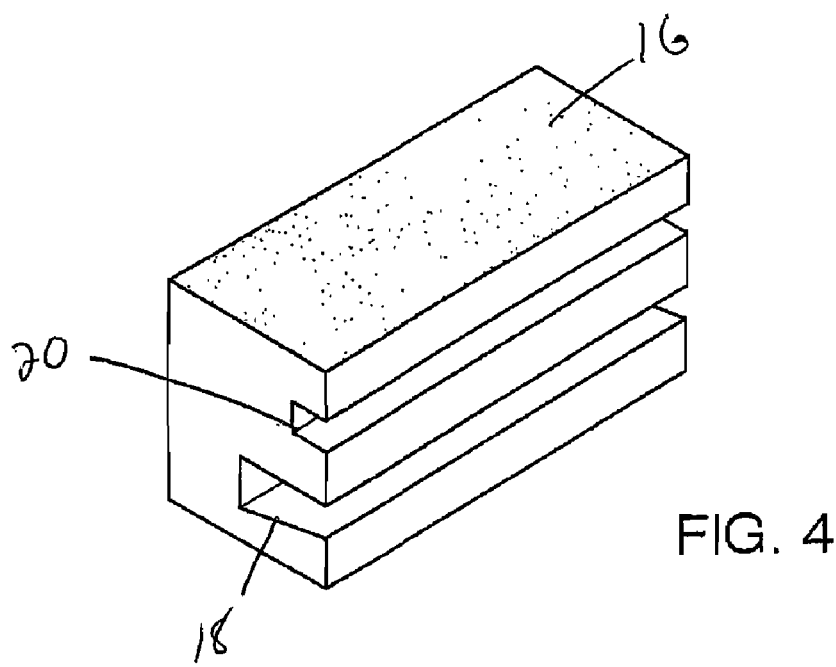
FIG. 4
FIG. 7
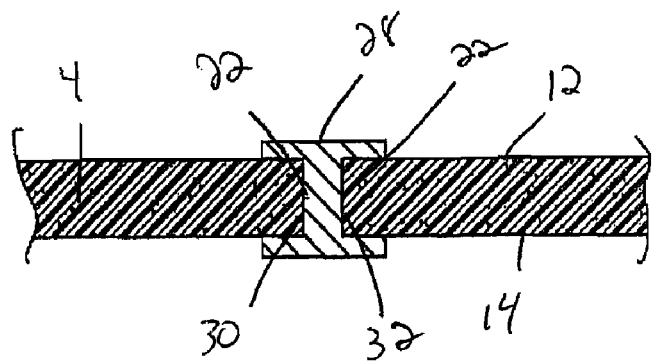

SYNTHETIC GROUND COVERING

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The present invention concerns that of a new and improved synthetic ground covering that is designed to replicate mulch, lava rocks, flag stones, sand, pebbles, straw, and other natural ground coverings.

DESCRIPTION OF THE PRIOR ART

U.S. Pat. No. 4,062,145, issued to Gidge, discloses a flexible, opaque mulch carpet for inhibiting weed growth while promoting plant growth, with the carpet having a central backing layer of non-rotting, synthetic, open mesh, fabric of relatively high tensile strength.

U.S. Pat. No. 3,870,583, issued to Gidge, discloses a low cost, flexible, opaque, mulch carpet that is performed of natural mulch material, such as bark particles of a conifer or hard wood, mixed with a resin binder, the mixture being molded in pockets of a pattern roll to form an irregular, grooved, natural-appearing mulch layer.

U.S. Pat. No. 2,949,698, issued to Downey, discloses a resilient permanent mulch pad.

U.S. Pat. No. 5,644,998, issued to Krolick, discloses a mulching system using opaque artificial mulching material in perforated embodiments.

U.S. Pat. No. 5,301,460, issued to Corbitt, discloses a mulch product and method of making same wherein the resultant mulch product includes a shredded fine portion, a bulky portion, and a stringy binding portion.

SUMMARY OF THE INVENTION

The present invention concerns that of a new and improved synthetic ground covering that is designed to replicate mulch, lava rocks, flag stones, sand, pebbles, straw, and other natural ground coverings. The ground covering is preferably fabricated from rubber or latex and is produced in rolls that measure fifty (50) feet long and eight (8) to twelve (12) feet wide, with the roll being unrolled like a section of carpet. The ground covering could be cut to conform to the shape of the landscape or designed to fit around the trees, poles, and other obstructions. Furthermore, the border would be flexible to allow it to fit within confined spaces or enclosures.

There has thus been outlined, rather broadly, the more important features of a synthetic ground covering that the detailed description thereof that follows may be better understood and in order that the present contribution to the art may be better appreciated. There are, of course, additional features of the synthetic ground covering that will be described hereinafter and which will form the subject matter of the claims appended hereto.

In this respect before explaining at least one embodiment of the synthetic ground covering, it is to be understood that the synthetic ground covering is not limited in its application to the details of construction and to the arrangements of the components set forth in the following description or illustrated in the drawings. The synthetic ground covering is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present synthetic ground covering. It is important, therefore, that the claims be regarded as including such equivalent constructions insofar as they do not depart from the spirit and scope of the present invention.

It is therefore an object of the present invention to provide a synthetic ground covering which has all of the advantages of the prior art and none of the disadvantages.

It is another object of the present invention to provide a synthetic ground covering which may be easily and efficiently manufactured and marketed.

It is another object of the present invention to provide a synthetic ground covering which is of durable and reliable construction.

It is yet another object of the present invention to provide a synthetic ground covering which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 3 shows a side cutaway view of a portion of a length of the synthetic ground covering.

FIG. 4 shows a perspective view of a connector used with the present invention.

FIG. 7 shows a side view of a connector that is used to connect two adjoining cover pieces.

DESCRIPTION OF THE PREFERRED EMBODIMENT

Figure 1:
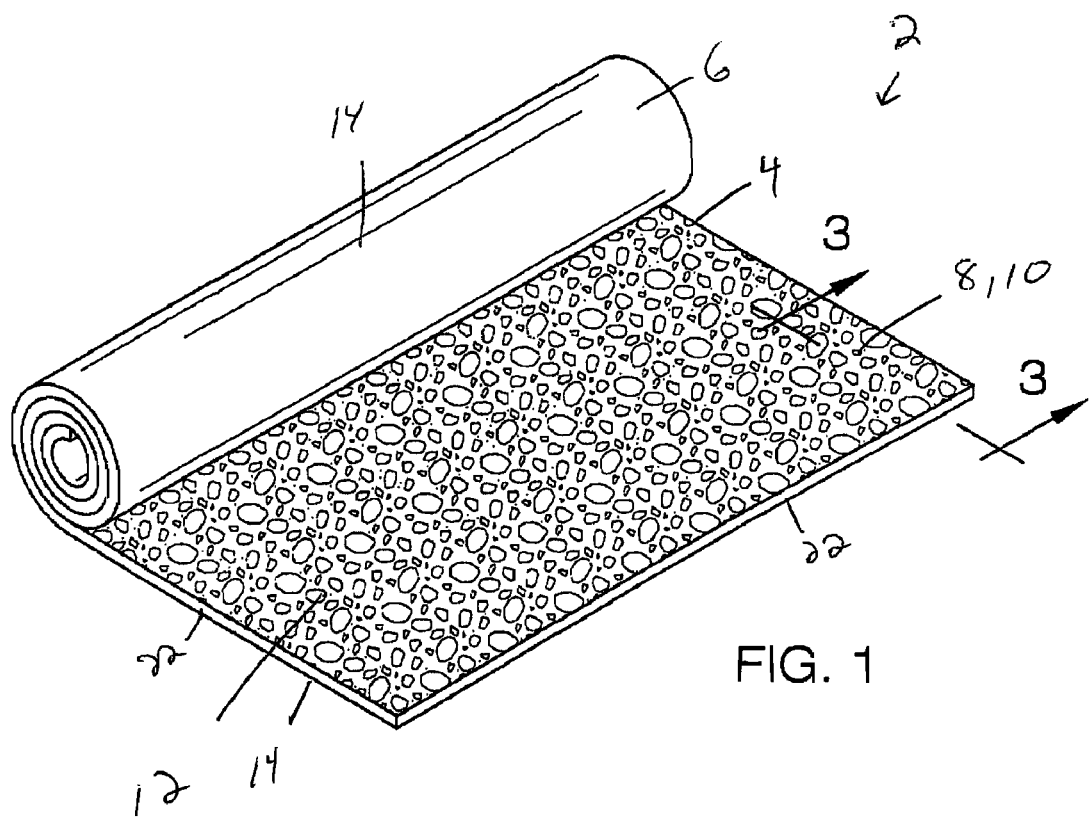
FIG. 1 shows a front perspective view of the synthetic ground covering as it would appear in the process of being unwound from its roll configuration.

With reference now to the drawings, and in particular to FIGS. 1 through 7 thereof, a new synthetic ground covering embodying the principles and concepts of the present invention and generally designated by the reference numeral 2 will be described.

As best illustrated in FIGS. 1 through 7, the synthetic ground covering 2 comprises a length of material 4, with the length of material 4 being rolled up into a roll 6. The material 4 can vary, but preferably, is either rubber 8 or latex 10.

The covering 2 has two surfaces comprising an upper surface 12 and a lower surface 14. The upper surface 12 is designed to look like a natural substance that is normally used in landscaping, which means that it can be designed to look like piles of rock, piles of wood chips, or other objects that would be used to create a natural-looking type of landscaping.

Figure 2:
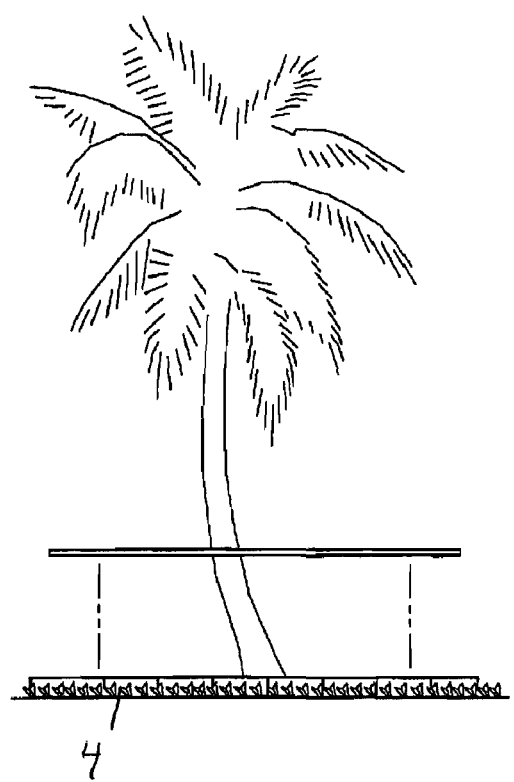
FIG. 2 shows a side view of the synthetic ground covering after it has been placed on a ground surface surrounding a tree.
Figure 5:
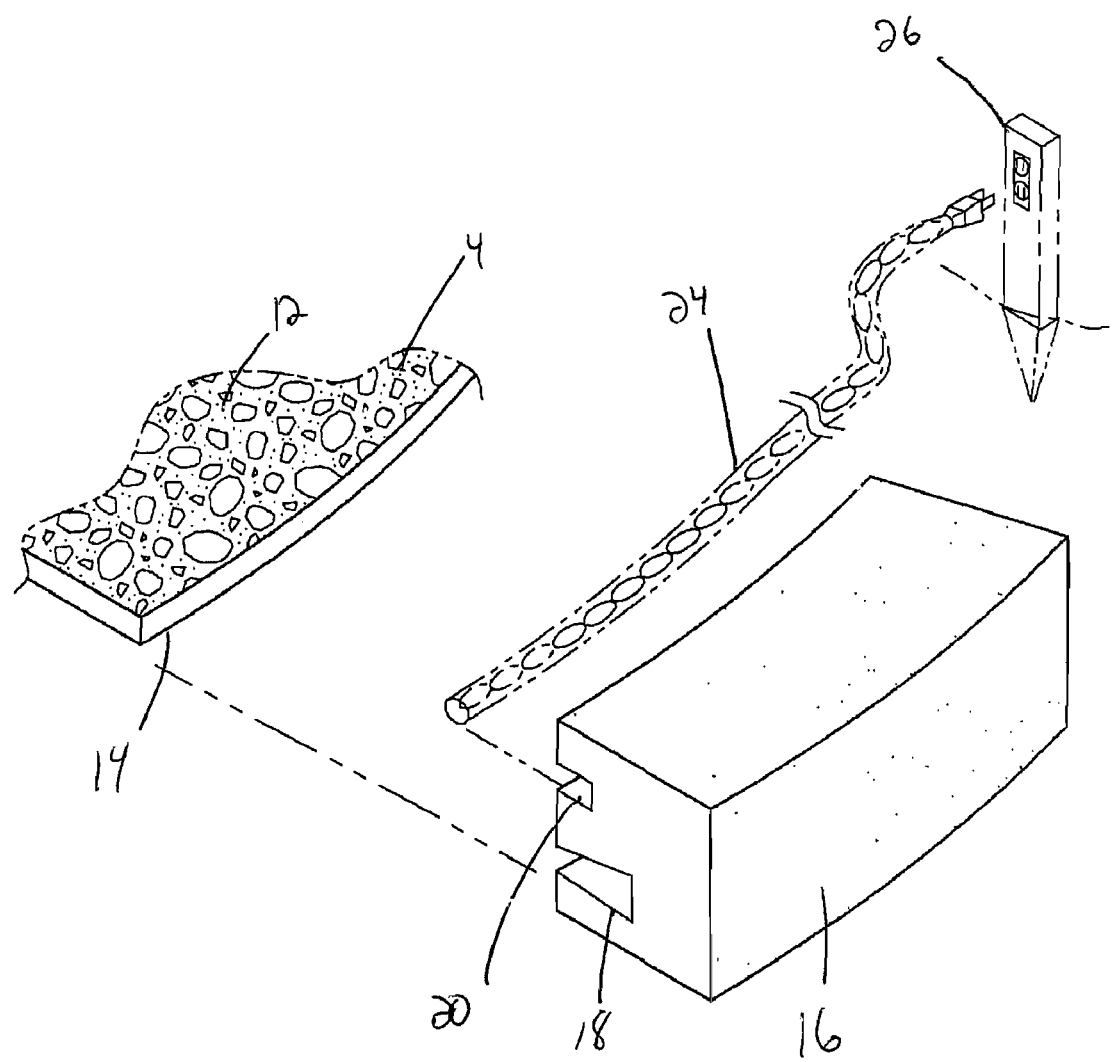
FIG. 5 shows a connector as it is being connected to a cover piece and a piece of rope while the piece of rope is being connected to a fixed stake for stability.
Figure 6:
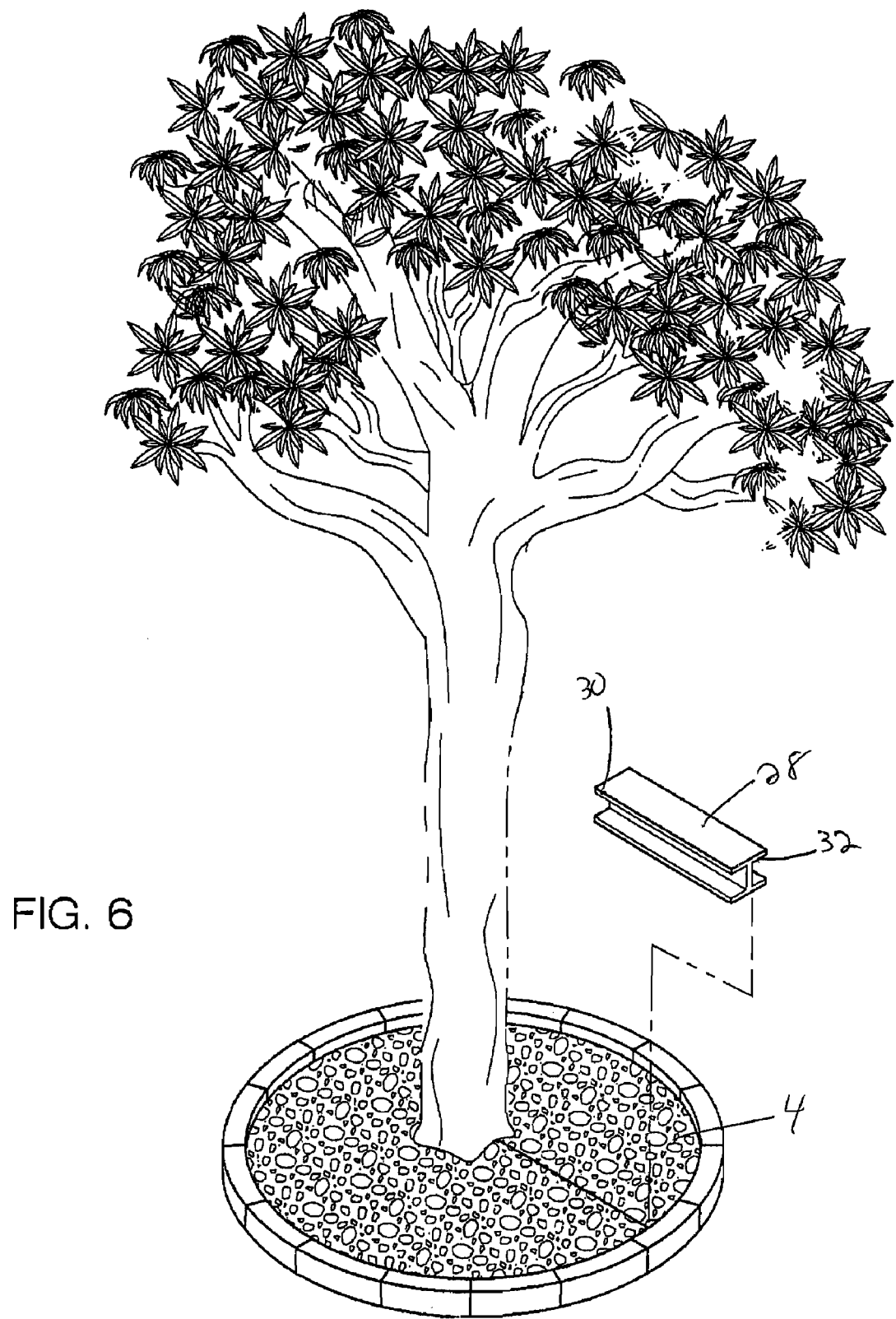
FIG. 6 shows the synthetic ground covering as it would appear in a particular, cut-out fixed shape, wherein the two ends of the synthetic ground covering are connected using a connector.

The length of each roll 6 of ground covering 2 preferably is fifty (50) feet long, with the width of each roll 6 preferably being eight (8) to twelve (12) feet wide. Each roll 6 can be cut out into a variety of shapes, such as a semi-circular shape 14 that is seen in FIGS. 2 and 6.

Various types of connectors can be used to secure portions of the covering 2 to a ground surface. Connector 16 has a specific length and has two inserts comprising a primary insert 18 and a secondary insert 20, which each are co-axial with one another and run the entire length of the connector 16. The primary insert 18 is designed to be significantly deeper into the connector 16 than the secondary insert 20. In use, this connector 16 would preferably be used by inserting an edge 22 of the covering 2 into the primary insert 18, while at the same time, taking a length of rope 24 and inserting it into the secondary insert 20. At the same time, the length of rope 24 would be attached to a stake 26 or other fixed object.

Another type of connector that could be used with ground covering 2 would be a H-bracket connector 28. The connector 28 has two inserts 30 and 32 which are opposite one another. Connector 28 allows an individual to connect two adjacent ground coverings 2 to one another to form a link between the two of them.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A synthetic ground covering system comprising:
    an amount of material;
    wherein the material is prepared in the shape of a roll, further wherein the roll has two surfaces comprising an upper surface and a lower surface,
    further wherein the upper surface of the roll is designed to look like a natural substance that is used for landscaping purposes;
    wherein the system further comprises at least one connector, further wherein each connector has a length;
    wherein each connector is used to connect portions of the roll to secure objects;
    wherein the connector further comprises
        a primary insert, wherein the primary insert runs the entire length of the connector, and
        a secondary insert, wherein the secondary insert runs the entire length of the connector, further wherein the secondary insert is co-linear with the primary insert;
    wherein the primary insert is deeper in the connector than the secondary insert.

2. The synthetic ground covering system according to claim 1 wherein the synthetic ground covering system further comprises means for securing the connector a fixed object.

3. The synthetic ground covering system according to claim 2 wherein the means for securing the connector a fixed object further comprises
    a length of rope, the length of rope inserted into the secondary insert,
    an object fixedly attached to a ground surface,
    wherein the length of rope is also attached to the object fixedly attached to the ground surface.

4. The synthetic ground covering system according to claim 3 wherein the object fixedly attached to a ground surface further comprises a stake.

5. The synthetic ground covering system according to claim 4 wherein the material is fabricated from rubber.

6. The synthetic ground covering system according to claim 4 wherein the material is fabricated from latex.

7. A synthetic ground covering system comprising
    (a) an amount of material, wherein the material is selected from the group consisting of rubber and latex,
    (b) at least one connector, wherein the connector has a length, further wherein each connector is used to connect portions of the roll to secure objects, wherein the connector further comprises (i) a primary insert, wherein the primary insert runs the entire length of the connector, (ii) a secondary insert, wherein the secondary insert runs the entire length of the connector, further wherein the secondary insert is co-linear with the primary insert, (iii) further wherein the primary insert runs deeper in the connector than the secondary insert,
    (c) means for securing the connector a fixed object, said means further comprising (i) a length of rope, the length of rope inserted into the secondary insert, (ii) an object fixedly attached to a ground surface, the object comprising a stake, (iii) wherein the length of rope is also attached to the object fixedly attached to the ground surface,
    (d) wherein the material is prepared in the shape of a roll, further wherein the roll has two surfaces comprising an upper surface and a lower surface,
    (e) further wherein the upper surface of the roll is designed to look like a natural substance that is used for landscaping purposes.

* * * * *